United States Patent [19]
Hannah

[11] Patent Number: 6,064,497
[45] Date of Patent: *May 16, 2000

[54] LOW COST DIGITAL SCANNERS

[75] Inventor: Eric C. Hannah, Pebble Beach, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/612,548

[22] Filed: Mar. 8, 1996

Related U.S. Application Data

[60] Provisional application No. 60/006,431, Nov. 10, 1995, and provisional application No. 60/011,320, Feb. 8, 1996.

[51] Int. Cl.[7] .............................. H04N 1/04; H04N 1/36
[52] U.S. Cl. .......................................... 358/486; 358/412
[58] Field of Search ........................ 358/505, 474, 358/486, 488, 494, 298, 412, 426, 407; 364/240, 260; 395/853, 377, 379; 341/126, 145

[56] References Cited

U.S. PATENT DOCUMENTS

| | | | |
|---|---|---|---|
| 4,748,514 | 5/1988 | Bell | 358/486 |
| 4,748,617 | 5/1988 | Drewlo | 359/121 |
| 4,797,806 | 1/1989 | Krich | 382/303 |
| 5,499,108 | 3/1996 | Cotte | 358/400 |
| 5,517,331 | 5/1996 | Murai | 358/412 |
| 5,627,658 | 5/1997 | Connors et al. | 358/407 |
| 5,809,337 | 9/1998 | Hannah et al. | 395/853 |
| 5,829,037 | 10/1998 | Sachs | 711/141 |

OTHER PUBLICATIONS

Universal Serial Bus Specification Revision 1.0, Jan. 15, 1996. Compaq, Digital Equipment Corporation, IBM PC Company, Intel, Microsoft, NEC, Northern Telecom.

IEEE Draft Standard for a High Performance Serial Bus, P1394, D8.0v2, Jul. 1995, DS3285. Institute of Electrical and Electronics Engineers, Inc.

*Primary Examiner*—Madeleine Nguyen
*Attorney, Agent, or Firm*—Duane, Morris & Heckscher LLP

[57] ABSTRACT

A scanner for generating digital image signals representing an object on a physical medium includes a detector and an analog-to-digital converter. The detector generates analog signals representing the object on the physical medium. The analog-to-digital converter converts the analog signals to digital image signals. The scanner is coupleable to an external processor by a high-speed serial bus that enables the scanner to transmit the digital image signals to the external processor without interim storage in an on-board buffer. The external processor may perform various imaging routines on the raw digital image signals from the scanner in real time, eliminating a need for an on-board processor in the scanner.

14 Claims, 4 Drawing Sheets

LOW COST DIGITAL SCANNERS

CROSS-REFERENCES TO RELATED APPLICATIONS

This non-provisional U.S. national application, filed under 35 U.S.C. §111(a) claims, under 35 U.S.C. §119(e)(1), the benefit of the filing date of provisional U.S. application Ser. No. 60/006,431, filed under 35 U.S.C. §111(b) on Nov. 10, 1995, and of the provisional application filed under 35 U.S.C. §111(b) on Feb. 8, 1996, assigned U.S. application Ser. No. 06/011,320 both being incorporated herein by reference.

BACKGROUND OF THE INVENTION

1. Field of the Invention

This invention relates to the field of digital scanners capable of generating digital signals from scanned text or graphics.

2. Description of the Related Art

Digital scanners typically are used to convert text or graphics on a physical medium, such as paper, to digital signals. Digital scanners include moving-document and fixed-document types. In moving-document types, the physical medium is moved over a receiving portion of the scanner. Fixed document scanners are compactly designed so that they can be moved across a surface of the information-bearing physical medium for reading the information.

Referring now to FIG. 1, a conventional digital scanner 10 typically includes control processor 15, analog-to-digital (A/D) converter 19 and buffer 18. Scanner 10 is coupled to computer 20 over bi-directional signal bus 16. Conventional computers, such as computer 20, typically include memory 22 and processor 24.

A functional block diagram of scanner 10 is shown in FIG. 2. Scanner 10 further includes a light source 11 for illuminating the physical medium, such as document 12. Document 12 typically is placed on a platen of scanner 10 (not shown in FIG. 2). Lens 13 forms an image of an object on document 12 onto detector 14. Detector 14 typically includes an array of elements, each of which converts incident light into an electrical charge or analog signal. Detector 14 can be, for example, a photodiode array, a charge-coupled device array or a charge-coupled photodiode device array.

As noted above, a scanner can be either of the moving-document or fixed-document type. A moving-document scanner typically uses mechanical structure to move the document 12 past detector 14, which remains stationary. A fixed-document scanner captures images by moving detector 14 relative to document 12, or else the entire object on document 12 may be captured at once on a fovea of detector 14.

The analog signal generated by detector 14 which forms the image of an object on document 12 is transmitted to A/D converter 19 for conversion into a digital image signal. The digital signal from A/D converter 19 is coupled to control processor 15. Control processor 15 typically includes hardware and software designed to manipulate the digital image signal from A/D converter 19, for example to improve image quality. For example, control processor 15 typically performs image enhancement and noise removal on the digital image signal. In the case of a text image, control processor 15 typically identifies individual characters in the image, in which case the scanner functions as an optical character recognition (OCR) system. One manner of character recognition involves comparing individual characters to a stored template of characters to be recognized.

Control processor 15 typically provides error correcting, for example, to correct character recognition errors or the like. For example, control processor 15 might include a spell-checking program for verification of word spelling to correct any erroneous text recognition.

Embodiments of control processor 15 also provide signal compression, especially where the digital image signal representing the object on document 12 comprises a large number of bits, such as when the object on document 12 includes color graphics or the like. Control processor 15 also can generate color transforms as necessary, such as by transforming an image in the RGB color space to the YUV or YIQ color space, and may subsample as necessary as a means for compressing the transformed image.

The high latency and low bandwidth of bus 16 limits the rate of transfer of digital image signals from scanner 10 to computer 20 to such an extent that interim storage of the digital image signals is required. On-board buffer 18 is provided for the interim storage. Digital image signals from buffer 18 are transmitted to computer 20 over bus 16 at a rate allowed by bus 16. When scanning multiple documents in relatively rapid succession, digital image signals from a plurality of images will tend to accumulate in buffer 18, because the bandwidth limitations of bus 16 prevent real-time transfer of the signals. A danger exists that buffer 18 will fill to capacity, resulting in an inability to add additional signals and a loss of some digital image signals.

The high latency and low bandwidth of bus 16 therefore limits real-time use and display of the digital image signals, since the digital image signals can not be transmitted from scanner 10 to computer 20 at a sufficiently high rate. In addition, bus 16 subjects the digital image signals to a risk of loss in the event of saturation of buffer 18. Moreover, the need for including buffer 18 in the hardware of scanner 10 adds to the cost of manufacturing scanner 10.

Digital image signals from buffer 18 can be used by an application running on computer 20, such as a spread sheet program, word processing program or the like, in cases where the image being scanned is a text image, or otherwise decompressed and displayed on a video monitor associated with computer 20, where the image is graphical. Of course, the digital image signals also may be stored in memory 22 on computer 20 for later use.

SUMMARY OF THE INVENTION

Briefly, in accordance with one embodiment of the invention, a scanner for generating digital image signals from an object on a physical medium includes a detector and an analog-to-digital converter. The detector generates analog signals representing the object on the physical medium. The analog-to-digital converter converts the analog signals to digital image signals. The scanner is coupleable to an external processor by a high-speed serial bus that enables the scanner to transmit the digital image signals to the external processor without interim storage in an on-board buffer.

BRIEF DESCRIPTION OF THE DRAWINGS

The following detailed description will be more fully understood with reference to the accompanying drawings in which.

DETAILED DESCRIPTION OF THE PREFERRED) EMBODIMENT

Figure 1:
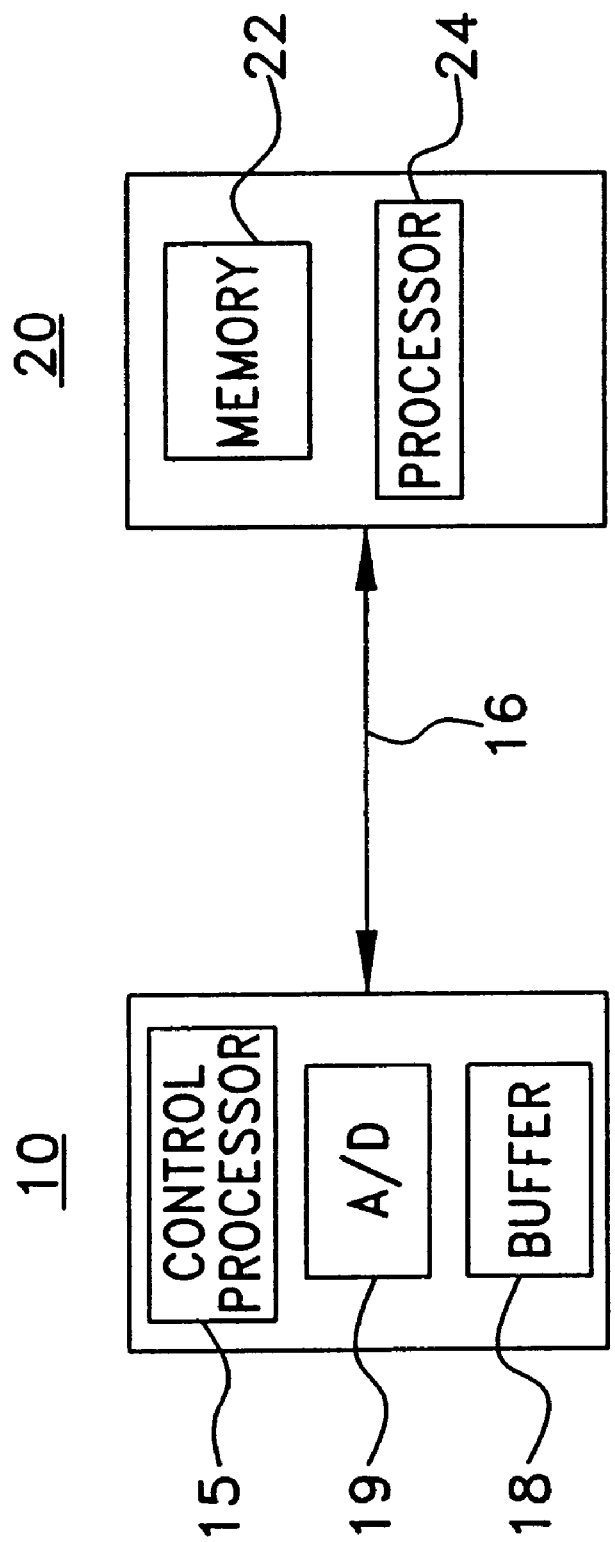
FIG. 1 is a block diagram of a conventional scanner coupled to a computer using a conventional bus.
Figure 2:
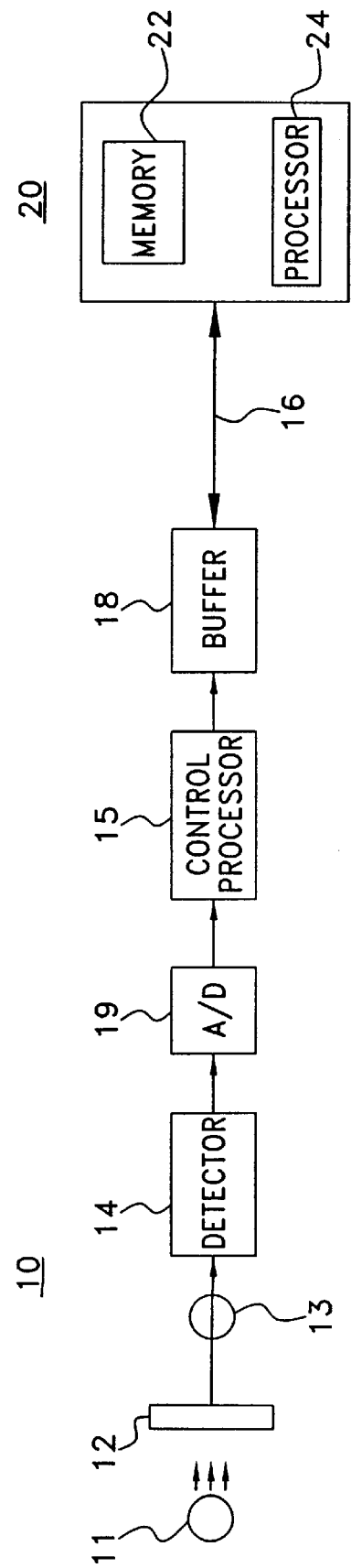
FIG. 2 is a functional block diagram of FIG. 1.
Figure 3:
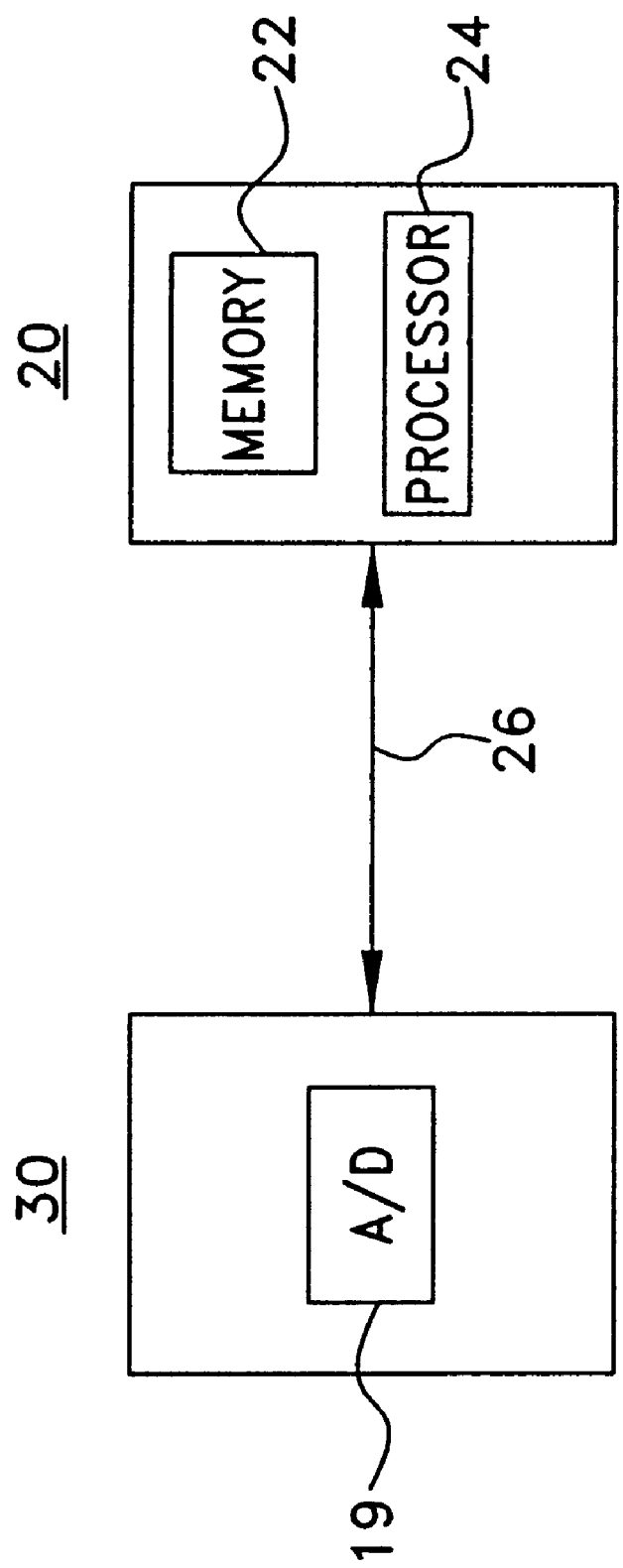
FIG. 3 is a block diagram of an embodiment of a scanner in accordance with the invention coupled to a computer using a high-speed serial bus.
Figure 4:
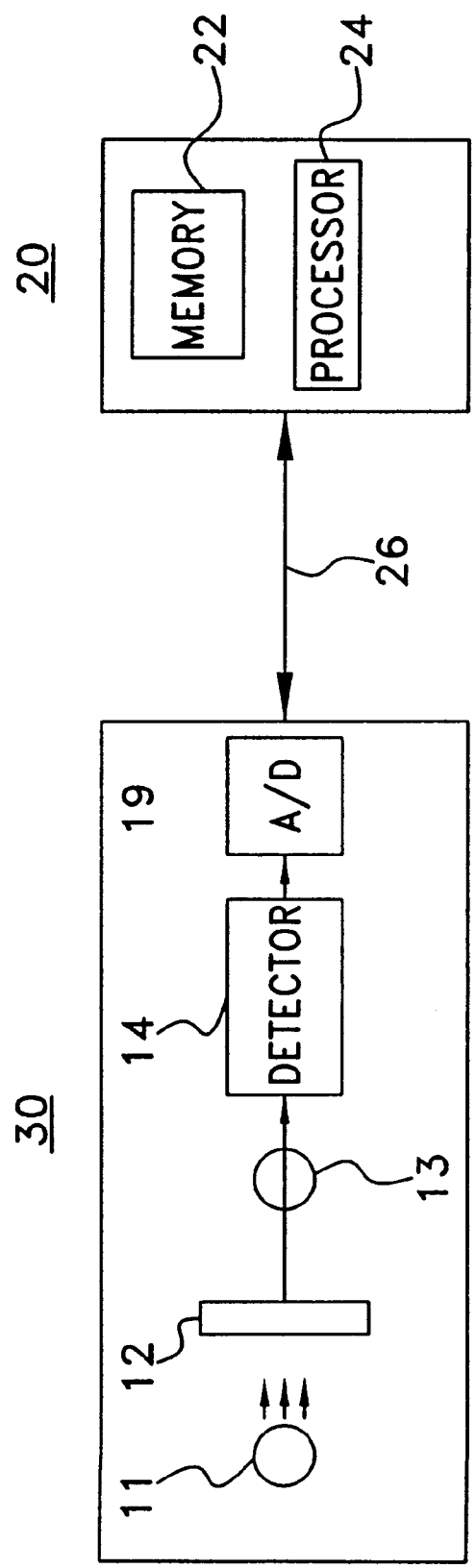
FIG. 4 is a functional block diagram of FIG. 3.

Referring to FIGS. 3 and 4, a substantial cost reduction in digital scanners is possible through the use of a new high-speed bus which provides low latency and high bandwidth. A bus of this type is disclosed in U.S. Provisional Application No. 60/006,431, filed Nov. 10, 1995, and U.S. Provisional Application No. 60/011,320 filed on Feb. 8, 1996, each being incorporated herein by reference.

In this particular embodiment, scanner 30 has light source 11 for illuminating document 12 being scanned. An object on document 12 is focused on detector 14 by lens 13 in a known manner. Detector 14 typically includes an array of elements for converting incident light into an electrical charge or analog signal representing the object on document 12. The object on document 12 may be text, graphics or a combination of both. The analog signal generated by detector 14 is converted into a digital signal representing the object on document 12 by A/D converter 19. It will, of course, be appreciated that the scope of the invention is not limited to this particular embodiment.

Scanner 30 is coupled to a computer 20 through high-speed serial bus 26. Bus 26 permits signal transfer between scanner 30 and computer 20 at a very high rate, such as 800 megabits per second (Mbits/sec). For example, in one embodiment the signal transfer rater is at least 750 Mbits/sec. Bus 26 further has a low latency, thereby enabling substantially immediate access of bus 26 by scanner 30 for signal transfer to, for example, computer 20.

The relatively high bandwidth and low latency of bus 26 reduces the need for an internal buffer in scanner 30, such as buffer 18 in conventional scanner 10, since bus 26 can transmit digital image signals essentially at a real-time rate, i.e., as they are generated by A/D converter 19 of scanner 30. Bus 26 permits real-time use and display of the digital image signals, for example, by applications running on, or on a video monitor associated with, computer 20.

Scanner 20 can be constructed without any interim storage devices, such as on-board buffers like buffer 18 in conventional scanner 10. The design of scanner 20 in association with bus 26 reduces the danger that digital image signals will "back up" in an on-board buffer to the point of saturation of the buffer, resulting in signal loss. Furthermore, manufacturing costs are kept down, since scanner 20 can be constructed without relatively expensive memory chips.

The relatively high bandwidth and low latency of bus 26 further enables transmission of digitized image signals from A/D converter 19 of scanner 30 at a signal rate sufficient for real-time, high-resolution imaging processing of the signals by processor 24 of computer 20. Processor 24 thus can be employed to perform imaging processing on the digital image signals from scanner 30, in lieu of an on-board processor in the scanner, such as control processor 15 in conventional scanner 10. Accordingly, scanner 30 can be manufactured without internal dedicated processing hardware and software, as is known in conventional scanners, further suppressing manufacturing costs for scanner 30 in comparison with conventional digital scanners.

On-board processors, such as control processor 15 in conventional scanner 10, typically use fixed algorithms for image enhancement, thereby precluding any ability to vary or customize the extent and quality of enhancement as needs might dictate. Furthermore, the need for maintaining conventional scanner costs within a reasonable ceiling necessarily limits the complexity of the control processors 15 and software which may be installed in scanner 10, consequently limiting the sophistication of image processing routines which may be run on the digital image signals. The large storage capacity of memory associated with a host computer, such as memory 22 of computer 20, and powerful processing capabilities of processor 24 of computer 20 (which capabilities continue to rapidly advance) enable running of plural and/or complex image processing applications on the digital image signals generated by scanner 30. Scanner 30 therefore transmits unprocessed raw digital image signals over bus 26 to computer 20 for subsequent processing, which may be in real time if so required. Digital image signals from scanner 30 therefore are preferably processed by the powerful and flexible image processing capabilities of, for example, processor 24 of computer 20, which can run, for example, character recognition, character-recognition error correction, signal compression, and color transformation routines, such as from an RGB format to YUV, YIQ or other formats, on the digital image signals.

Scanner 30 represents a significant improvement in conventional scanner technology. Substantial cost savings can be realized by the elimination of on-board hardware, such as control processors and signal storage buffers. Furthermore, image quality improvements no longer are dependent on expensive improvements to scanner hardware and software but essentially are wholly reliant on improvements to, for example, computer processor 24. Significantly, computer processor technology continues to rapidly advance, and as it does, so will improvements to the quality of the reproductions of objects scanned by scanner 30.

It should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A system for generating digital image signals representing an object on a physical medium, comprising:

(a) a scanner comprising a detector and
an analog-to-digital converter, wherein:
the detector generates analog signals representing the object on the physical medium; and the analog-to-digital converter converts the analog signals to raw digital image signals at a rate of transmission;

(b) a high-speed serial bus coupled to the scanner; and (c) an external processor external to the scanner and coupled to the high-speed serial bus, wherein the external processor is capable of processing the raw digital image signals at the rate of transmission; and the high-speed serial bus has a sufficiently high bandwidth and a sufficiently low latency to enable the scanner to transmit the raw digital image signals to the external processor in real time, at the rate of transmission, without prior interim storage in an on-board buffer and without prior processing of the raw digital image signals by an on-board processor, wherein the bandwidth is at least 750 Megabits per second.

2. The system of claim 1, wherein the object comprises text and the external processor can perform at least one of character recognition and character-recognition error correction.

3. The system of claim 1, wherein the object comprises graphics and the external processor can perform at least one of signal compression and color transformation from an RGB format to one of a YUV and YIQ format.

4. The system of claim 1, wherein the external processor is part of a computer, wherein the computer is coupleable to a video monitor and an image of the object is displayable on the video monitor.

5. The system of claim 1, wherein the processor is part of a computer, the computer further comprising memory, wherein the digital image signals are storable in the memory.

6. The system of claim 1, wherein:

the external processor is part of a computer further comprising memory, the digital image signals being storable in the memory, the computer being coupleable to a video monitor, the image of the object being displayable on the video monitor; and the external processor can perform at least one of character recognition, character-recognition error correction, signal compression and color transformation from an RGB format to one of a YUV and YIQ format.

7. A scanner for generating digital image signals representing an object on a physical medium, the object comprising at least one of text and graphics, the scanner comprising:

(a) means for generating analog signals representing the object on the physical medium; and (b) means for converting the analog signals to raw digital image signals at a rate of transmission, wherein:

the scanner is coupleable to an external means for processing by a high-speed serial bus means;

the external means for processing is capable of processing the raw digital image signals at the rate of transmission and comprises means for recognizing characters, means for character-recognition error correction, means for signal compression, and means for color transformation from an RGB format to one of a YUV and YIQ format at the rate of transmission; and the high-speed serial bus has a sufficiently high bandwidth and a sufficiently low latency to enable the scanner to transmit the raw digital image signals to the external means for processing in real time, at the rate of transmission, without prior interim storage in an on-board means for storage and without prior processing of the raw digital image signals by an on-board processing means, wherein the bandwidth is at least 750 Megabits per second.

8. The scanner of claim 7, wherein the external means for processing is part of a computer, wherein the computer is coupleable to a display means and an image of the object is displayable on the display means.

9. The scanner of claim 7, wherein the external means for processing is part of a computer, the computer further comprising computer storage means, wherein the digital image signals are storable in the computer storage means.

10. The scanner of claim 7, wherein:

the external means for processing is part of a computer, the computer further comprising computer storage means, wherein the digital image signals are storable in the computer storage means, the computer being coupleable to a display means and an image of the object being displayable on the display means; and the external means for processing comprises at least one of means for recognizing characters, means for character-recognition error correction, means for signal compression and means for color transformation from an RGB format to one of a YUV and YIQ format.

11. In a system comprising a scanner and an external processor, a method for generating digital image signals representing an object on a physical medium, the object comprising at least one of text and graphics, the method comprising the steps of:

(a) generating analog signals representing the object on the physical medium;

(b) converting the analog signals to raw digital image signals at a rate of transmission (c) transmitting with the scanner the raw digital image signals to an external processor by a high-speed serial bus without prior local interim storage of the raw digital image signals wherein the serial bus has a sufficiently high bandwidth and a sufficiently low latency to enable the scanner to transmit the raw digital image signals to the external processor in real time, at the rate of transmission, wherein the bandwidth is at least 750 Megabits per second; and (d) performing in real time, at the rate of transmission, at least one of the following on the raw digital image signals with the external processor: character recognition, character-recognition error correction, signal compression, and color transformation from an RGB format to one of a YUV and YIQ format, wherein the scanner is able to transmit the raw digital image signals to the external processor without prior processing of the raw digital image signals by an on-board scanner processor.

12. The method of claim 11, wherein the external means for processing is part of a computer, wherein the computer is coupled to a display means further comprising the step of:

(d) displaying an image of the object on the display means.

13. The method of claim 11, wherein the external means for processing is part of a computer, the computer further comprising computer storage means, further comprising the step of:

(d) storing the digital image signals in the computer storage means.

14. The method of claim 11, wherein the external processor performs at least one of recognizing characters, correcting character-recognition errors, signal compression and color transformation from an RGB format to one of a YUV and YIQ format and wherein the external processor is part of a computer, wherein the computer comprises computer storage means and is coupled to a display means, the method further comprising the steps of:

(d) displaying an image of the object on the display means; and (e) storing the digital image signals in the computer storage means.

* * * * *